(12) United States Patent
Chang

(10) Patent No.: US 6,842,720 B2
(45) Date of Patent: Jan. 11, 2005

(54) METHOD OF ANALYZING AND CONTROLLING THE UNIFORMITY OF TIRES

(75) Inventor: Loh-Yi Chang, Simpsonville, SC (US)

(73) Assignee: Michelin Recherche Technique S.A., Granges-Paccot (CH)

( * ) Notice: Subject to any disclaimer, the term of this patent is extended or adjusted under 35 U.S.C. 154(b) by 45 days.

(21) Appl. No.: 10/379,055

(22) Filed: Mar. 4, 2003

(65) Prior Publication Data

US 2003/0149542 A1 Aug. 7, 2003

Related U.S. Application Data

(63) Continuation of application No. PCT/US01/17664, filed on Jun. 1, 2001.

(51) Int. Cl.[7] .......................... G06F 19/00; B60C 11/03
(52) U.S. Cl. ..................................... 702/182; 152/209.2
(58) Field of Search ..................... 73/146, 146.2–146.8; 702/182, 185, 84; 700/108–111; 152/209.2, 209.3

(56) References Cited

U.S. PATENT DOCUMENTS

| | | | |
|---|---|---|---|
| 4,815,004 A | | 3/1989 | Beebe |
| 5,396,438 A | * | 3/1995 | Oblizajek ..................... 702/84 |
| 6,065,331 A | * | 5/2000 | Fukasawa .................... 73/146 |
| 6,139,401 A | | 10/2000 | Dunn et al. |
| 2002/0177959 A1 | | 11/2002 | Williams et al. |
| 2002/0177964 A1 | * | 11/2002 | Shteinhauz .................. 702/75 |

OTHER PUBLICATIONS

U.S. Pat. No. 2002/0177959 A1, Pub. Date: Nov. 28, 2002.
U.S. Pat. No. 2002/0177964 A1, Pub. Date: Nov. 28, 2002.

* cited by examiner

Primary Examiner—Patrick J Assouad
(74) Attorney, Agent, or Firm—Martin Farrell; Alan A. Csontos; Martin Remick

(57) ABSTRACT

A method of controlling uniformity during tire manufacture includes the steps of selecting a target attribute and assigning a target value thereto, measuring the target attribute in a subject tire at a first rotational speed approximating highway speed and measuring in the subject tire indicator attributes a second rotational speed lower than the first rotational speed. The indicator attributes are condensed via a multivariate process to determine which attributes are the most strongly related to the target attribute. Next, a plurality of predictors for the target attribute is determined, each predictor having components including at least one indicator attribute. From the plurality of predictors, at least one best predictor is selected. The measurements for the indicator attributes making up the selected predictor are compared to limit values for the indicator attributes, and, responsive to the comparison, the tire manufacturing process may be controlled to correct any deviation between the measured attribute and the limit value for at least an additional subject tire. Production tires are measured for the components of the selected predictor at the second rotational speed, and a value for the target uniformity attribute is predicted based on the selected predictor for the additional subject tire. The predicted value is compared to the target value to allow for sorting or grading the tires.

18 Claims, 1 Drawing Sheet

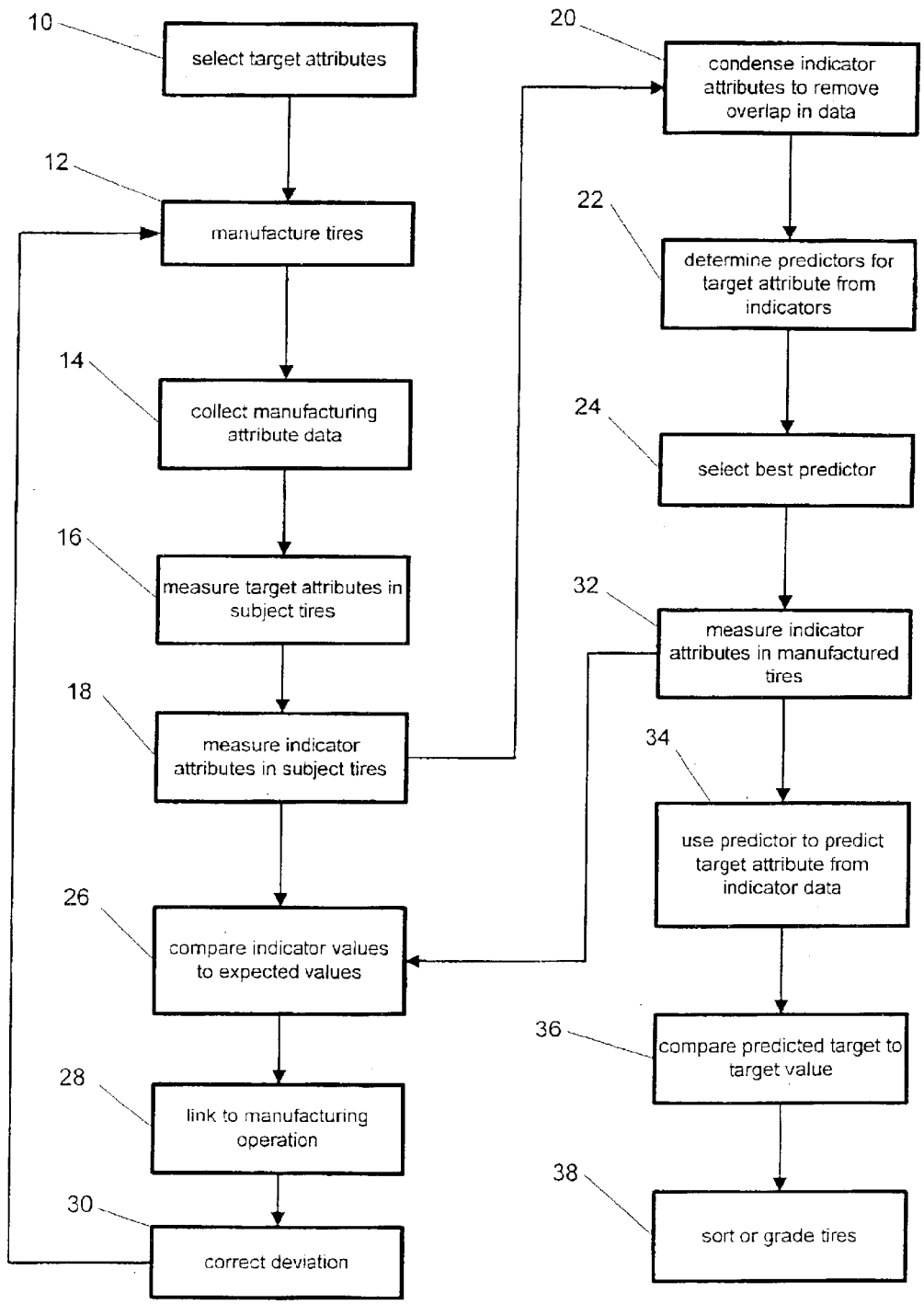

METHOD OF ANALYZING AND CONTROLLING THE UNIFORMITY OF TIRES

This application is a copy of PCT/US01/17644 Jun. 1, 2001.

BACKGROUND AND SUMMARY

The invention relates to tire uniformity, and more specifically to a method for analyzing and controlling the uniformity of tires during tire manufacturing.

Tire non-uniformity relates to the symmetry (or lack of symmetry) relative to the tire's axis of rotation in mass, geometric, or stiffness characteristics. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out and lateral run out), mass variance, and rolling force variations (radial force variation, lateral force variation, and tangential force variation, sometimes also called longitudinal or fore and aft force variation).

The art includes different methods for measuring uniformity in tires. Typically, rolling force variations are measured as the spindle force and moment variations of a tire and wheel assembly rotating under load against a road wheel or track. Geometric variations are usually measured as deviations from an average dimension. Mass variance measurement is typically limited to mass imbalance, which is the first harmonic component of mass variance. Mass imbalance may be measured statically on a balance device or on a device that rotates the tire with respect to an axis passing through the geometric center of the tire without applying a load to the tire.

Measurement of non-uniformities is typically done for quality control after manufacturing the tire to determine the effect the non-uniformities will have on a vehicle, that is, the vibrations that will be produced by the non-uniformities. The measurement can be used, for example, to reject tires or to sort or grade tires according to the vehicle for which the tire will be used, if relevant values for the measured variations can be determined.

A difficulty in evaluating non-uniformity measurements is that force variations are derivative of one or more underlying physical non-uniformities such as joint overlap, cord spacing, and tread gauge. Force variations may also be related to other measurements such as the geometric run out measurements. Thus, error may be introduced in the evaluation of the force variations unless the interaction inter-relations among variables are taken into account.

Another difficulty is in the actual measurement and evaluation of the force variations caused by tire non-uniformities. The magnitude of force variations often is a function of the speed of rotation of the tire, and thus, to completely measure the force variation would require the tester to rotate and measure the tires at a variety of speeds. While it is possible to test tires throughout a range of relevant speeds, it is expensive and time-consuming to do so.

Another difficulty in actual high speed measurement is that at high speed rotation the measurement data includes noise associated with the hardware and software used to make the measurements, for example, machine resonance, tire/wheel mounting aberrations, transducer calibration error and cross-talk between transducers, and limitations of the sampling and averaging procedures. Generally, testing at low rotation speeds is simpler and less expensive than testing at high rotation speeds.

To avoid using exhaustive testing protocols, some working in the art have devised methods for using low rotational speed measurements to predict the force variations at high rotational speeds. British patent publication no. 1,212,701 by Gough relates the changes in effective rolling radius at low speed to the tangential force variation (fore and aft) at high speed. U.S. Pat. No. 4,815,004 to Beebe relates changes in effective rolling radius, and derivative measurements, acceleration of the tread surface, angular acceleration, and acceleration of the load wheel relative, to the angular acceleration of the tire to the tangential force variation at high speed. In both these publications, tangential force variation is stated to be the main cause of steering wheel vibrations at high speed. U.S. Pat. No. 5,396,438 to Oblizajek uses variations in two low speed measurements selected from the set of effective rolling radius, radial force variation, geometric run out and tangential force variation to predict tangential force variation at high speed.

These methods have an important limitation related to the selection and handling of the tire attributes. The attributes to be tested and the attribute to be predicted are selected and fixed, and are not evaluated for importance for the particular structure of the subject tire.

In these methods, the attributes are also treated as if each is totally independent of any other attribute, which can lead to errors if, in fact, the selected attributes overlap, that is, are to some degree coherent.

The present inventor has discovered that by measuring a plurality of tire attributes at low speed and first evaluating the attributes for relevance in predicting one or more high speed attributes, an improved method of predicting high speed uniformity attributes is obtained.

In addition, one aspect of the invention relates to using the information derived from evaluating the slow speed attributes to identify and control aspects of the manufacturing process that may be producing the non-uniformities.

According to the invention, a method of analyzing and controlling uniformity during tire manufacture comprises the steps of selecting at least one target attribute and assigning a target value thereto, measuring the target attribute in a subject tire at a first rotational speed approximating highway speed, measuring a plurality of indicator attributes in the subject tire at a second rotational speed lower than the first rotational speed, determining a plurality of predictors for each at least one target attribute, each predictor including at least one of the indicator attributes, selecting a predictor from the plurality of predictors, measuring indicator attributes of the selected predictor in an additional subject tire at the second rotational speed, predicting a value for the target attribute based on the selected predictor for the additional subject tire, and comparing the predicted value of the target attribute to the target value.

According to another aspect of the invention, the method further comprises the steps of comparing the measured indicator attributes making up the selected predictor to limit values for the indicator attributes to determine a deviation therebetween, identifying manufacturing operation related to the deviation, and responsive to the comparison, controlling the identified manufacturing operation to correct the deviation for at least an additional subject tire.

According to the invention, the target attribute is a tire force and/or a tire moment response produced during rotation of the tire, for example, radial force variation, tangential force variation, lateral force variation, or self-aligning moment variation, that has been identified as being of interest. The indicator attributes include mass variance, geometric variance measurement, and a force response produced during rotation of the tire.

According to another aspect of the invention, the method includes the step of sorting tires responsive to the comparison of the predicted value to the target value.

According to yet another aspect of the invention, the method includes the step of determining a plurality of predictors includes condensing the set of indicator attributes to remove overlap, that is, coherence, in the measured data, and determining a ranking of importance of the condensed indicator attributes to predicting the target attribute.

These and other aspects and embodiments of the invention will become better understood by reference to the following detailed description.

BRIEF DESCRIPTION OF THE DRAWING

The sole FIGURE is a flow diagram of a uniformity analyzing method in accordance with the invention.

DETAILED DESCRIPTION

The goal of controlling tire uniformity is to manufacture tires that generate minimal annoying vibration transmissions to the occupants. Because these vibrations may make riding on the tires uncomfortable, from the perspective of the occupant, the goal is to control the comfort of the tires. The present invention provides a method for evaluating the uniformity of tires and controlling manufacturing for uniformity that improves on conventional methods by identifying and focusing on tire attributes relevant to comfort for the vehicle on which the tire will be used. A relevant tire attribute is a measurable characteristic of the tire that can be related to the comfort of the tire on a vehicle. Further, the invention allows the continuous correction of manufacturing procedures to improve uniformity.

Force variations measured at the wheel axle during tire rotation only indirectly measure non-uniformities. Because force variations are directly related to the vibrations transmitted to the vehicle, they have come to be commonly relied on in evaluating tire uniformity. Different vehicles, however, respond differently to vibrations produced at the wheel axle because of differences in suspension, frame, cabin structure, and other structural elements between the tire and the occupants. Thus, a particular non-uniformity may produce a force variation that would be unacceptable in one vehicle model but may not be noticeable in another model. A single non-uniformity standard that applied to all tires for acceptability to all vehicles would be too restrictive.

Typically, the measured attributes are decomposed into their harmonic components via Fourier transformation. Harmonic decomposition is the most commonly used technique to 'quantify' the variations in measurements of attributes. The quantification process, in turn, enables the representation of the functional relationship in terms of linear equations.

It is possible, then, to model the comfort of the tires as a linear function of the harmonics of readily measurable tire attributes, i.e.:

$$\text{Comfort, } Z = \Sigma B_i \cdot X_i + \text{constant} \quad (1)$$

Where, X represents a tire uniformity attribute and B represents a coefficient relating the uniformity attribute to vehicle comfort. A uniformity attribute as used here means an attribute that is indicative of the tire's contribution to comfort, and is also called here an indicator attribute. These include variations relative to the tire's axis of rotation in stiffness, geometry, mass, structure (reinforcing cord spacing, angle, and gage, tread gauge, joint formation, component thickness, etc.), the particulars of the forming drum and the curing mold, and any other attribute that experiences variety during the course of manufacturing tires.

It is difficult, if not impossible, to relate these various attributes directly to comfort. In addition, differences in vehicle structure and vehicle dynamics, and differences in how a driver will perceive vibrations manifested in the seat and steering wheel, make arriving at a single value for Comfort (Z) difficult. Rather, a statistical value, a mean and standard deviation of x over a population of tires and/or vehicles, that is, of the magnitudes of harmonics, would better represent the measured Comfort.

To avoid the difficulties in directly relating Comfort to tire indicator attributes, the invention proposes a multiple step approach. The first step is to relate some uniformity attributes to comfort:

$$\text{Comfort, } Z = \Sigma C_j \cdot Y_j + \text{constant} \quad (2)$$

where $Y_j$ is a set of high or low speed uniformity attributes, for example, force variations, which may be linked to comfort in a relatively easy manner, and $C_j$ is a coefficient that relates the measured attributes to comfort.

The second step is to link the uniformity attributes to the tire's uniformity attributes:

$$\{Y_j\} = \Sigma B_i \cdot X_i \quad (3)$$

where X is an array of uniformity attributes and B is a coefficient linking the uniformity attributes to the array of high speed uniformity attributes {Y}.

Equations 2 and 3 suggest a procedure for measuring or rating the comfort of a tire, but do not relate to controlling for comfort during manufacture. The link to manufacturing is done by relating a set of measurable tire attributes $X_i$ to the underlying engineering, manufacturing, and material characteristics:

$$X_i = \Sigma D_i \cdot U_i \quad (4)$$

where $U_i$ represents tire attributes that are traceable to engineering, manufacturing, or material characteristics and $D_i$ is a coefficient relating the characteristics to the measured tire attributes. The indicator attributes, $X_i$, for example, force variations, geometric variations, mass variance, and structural variations (reinforcing cord spacing and angle, tread gauge, joint location and overlap, layer thickness, etc.), can be related to engineering, manufacturing, and material characteristics through quality assurance methods, and engineering and technical knowledge.

By solving equations 2, 3, and 4 simultaneously, a linkage between manufacturing of the tire and the tire comfort can be established. Traditional regression techniques, however, are not suitable for this purpose. The inventor, therefore, employed multivariate data analysis (MVDA) techniques.

Multivariate analysis techniques are well documented and software packages are available from, for example, Proc PLS from SAS Institutes, SAS Circle, Box 8000, Cary, N.C. 27512-8000. These will not be described in detail herein. As explained below, a multivariate approach has other advantages that make the method of the invention more powerful.

FIG. 1 is a flow diagram of a method according to the invention. A first step 10 of the method begins by selecting a target attribute or attributes. By attribute is meant a measurable characteristic of the tire that relates to the comfort of the tire on a vehicle. The initial task is to link the "comfort" of the vehicle to one or more measurable attributes of the tire, for example, by determining what non-uniformities in the tire cause annoying vibrations in the seat or steering wheel. This may be done by testing a vehicle directly or modeling a vehicle suspension and chassis for transmission of particular frequency and amplitude combinations.

In some cases, the vehicle manufacturer or analysis of a vehicle suspension may provide information that a particular attribute or attributes, for example, tangential force variation, lateral force variation, or radial force variation, having a value above a particular threshold produces unacceptable vibrations in the vehicle. Further, the information may indicate that at a particular speed of rotation of the tires the vehicle is particularly susceptible to the generation and transmission of the vibration. Typically, the rotational speeds at which vibrations are unacceptably noticeable correlate to a particular vehicle driving speed, which often is a highway speed, but may also be a lower local speed.

The at least one target attribute is therefore identified for the vehicle, and will have associated with it a specific rotational speed and a maximum allowable value or limit value.

Tires are manufactured and a subject tire or set of subject tires is selected from the manufactured tires 12. The subject tire serves as a baseline for the subsequent method steps, and will typically be a tire chosen from the manufacturing line once the manufacturing procedure is considered stable, that is, the manufacturing line is producing tires that are, within manufacturing tolerance, identical.

During manufacture, data is collected 14 on the engineering specifications, the materials used, and the manufacturing process, the manufacturing attributes. The manufacturing attributes include, for example, measurements made on the tires in the uncured state such as mass balance, mass distribution variance (using beta, capacitance, or laser gages, for example), radial run out, lateral run out, tread gauge, rolling force variations, and physical attributes of the mold. The dimensional variations, position, and orientation of the various products on the forming drum and relative to one another could also be measured. These may include splice or joint dimensions, reinforcing belt positions, variations in cord spacing, cord angle, and cord uniformity, thickness of various layers, and other characteristics. This data is used in a later-described part of the method for controlling uniformity.

The set of subject tires is tested for the at least one target attribute 16. The target attributes will typically include the force variations, i.e., radial, lateral, and tangential, measured at the target rotation speed, which will usually be a speed approximating vehicle highway speeds. Because of the 'impedance' (spring rate) difference between high speed uniformity machines and the vehicle, the highway approximating test speed is usually 10–20 kph higher than the actual speed of the vehicle would be. As mentioned, force variations are more readily linked to comfort. Advantageously, the method of the invention allows the high speed measurement to be done once, and need be repeated only after a change in the manufacturing process.

The set of subject tires is also tested for indicator attributes 18 that will include attributes to be measured for all subsequent subject tires. The indicator attributes include things that are readily and easily measured: mass balance, radial run out, lateral run out, rolling radius variation, tread surface acceleration, radial force variation, lateral force variation, and tangential force variation. The indicator attributes measured on a rotating tire are measured at low speed or statically, which as mentioned above, are easier and less expensive to perform. The indicator attributes could also include tread gauge variation (the variation in the depth of a groove about the circumference) and variations in crown curvature (radius), thickness, or other readily measured attributes.

The data, both target attributes (if more than one is measured) and the indicator attributes, are then condensed in step 20 using Multivariate Data Analysis techniques, for example, Principal Component Analysis or partial least squares (PLS). Multivariate Data Analysis such as PLS uses the 'principal components' as intermediaries to relate the input and output variables. The attributes are condensed into principal components, which are linear combinations of the actual measured attributes, or input variables, that explain the variance in the target or output variables. The principal components are often referred to as latent variables, as these are not actual measured or measurable variables. MVDA is accordingly sometimes refers as an 'indirect' modeling technique. If more than one target attribute is measured, the target attributes would also be condensed into principal components to link to the principal components of the indicator attributes. The principal components will have an associated numerical value indicative of the relationship to the target variable. For example, a principal component may explain 80% of the variance of the target attribute.

Principal component analysis also ranks the measured attributes according to the contribution of each attribute to the principal components. It is possible then to eliminate one or more indicator attributes as being of small importance or being redundant, to 'remove interactions among the measurements, to reduce irrelevant indicator attributes, and to minimize noise in the data.

The remaining attributes are then used to form predictors for the target attributes 22. The indicator attributes are related, either alone or in combination with other indicator attributes, to the target attributes using a suitable technique, such as a multivariate analysis regression or a multiple regression.

From the various predictors that are formed, those best representing the target attributes are selected 24. One technique for determining the best representative is by using a vector form of $R^2$:

$$R^2 = 1-(\text{variance/sum of squares}) \quad (5)$$

where the variance is the sum of squares of all of the variance vectors of each indicator attribute:

$$\text{Variance} = \Sigma(\text{measured value} - \text{model value})^2 \quad (6)$$

and the sum of the squares of all the attributes is represented by:

$$\text{Sum of Squares} = \Sigma \text{Variance}_i \quad (7)$$

The step of selecting a best predictor from a plurality of predictors has the unexpected advantage of identifying as valuable indicator attributes that the art has considered of low value or ignored. For example, although mass imbalance is known to have an effect on uniformity and force variation at high speed, it was generally thought that mass imbalance effects were minimal after the tire and wheel were balanced by attaching counterweights to the wheel. The method of the invention has shown (as detailed in the example below) that mass imbalance in combination with variation in Radial Force (rolling radius variation is a third tier input for harmonic one HSU.) is a strong predictor of high speed attributes such as the harmonic 1 component of radial and/or tangential force variation.

Another advantage of condensing the indicator attributes data and forming predictors is that it eliminates the reliance on an assumption, as typically made in conventional techniques, that the non-uniformity force variations of all tire designs are equally well predicted by the same set of low speed attributes. The method of the invention allows for the most relevant attributes and strongest predictors to be identified for each tire model tested under the methods.

The set of indicator attributes may also be condensed and linked via Multivariate Data Analysis (multiple regression) techniques in the manner described above to the manufacturing attributes 26. The linkage identifies the sources for the variation in the indicator attributes 28 by identifying those manufacturing steps most strongly linked to the indicator attributes. The particular manufacturing steps can then be evaluated, and corrections or adjustments may be made to the manufacturing procedures to reduce these variations 30.

With the target attributes and predictors established, the method is then applied to the manufacture of production tires for evaluating and controlling uniformity. As additional tires are manufactured, they are measured for the indicator attribute or attributes associated with the selected predictor 32. The attribute or attributes are combined into the predictor and a predicted target attribute value is calculated for each additional tire 34. The predicted value for the target attribute is compared to the limit value, or maximum permitted value, that was earlier determined 36. The tire is then sorted or graded according to the comparison 38.

The indicator attributes measured in the production tires are also used to control the manufacturing process to reduce any identified unacceptable force variations, working backwards from the predictor and the associated indicator attributes. The production of tires will have linked various indicator attributes to the underlying manufacturing attributes 26. According to the method, the indicator attributes associated with the predictor will be used to identify the manufacturing attributes most responsible for the variations, using the same multivariate techniques 28. Once the manufacturing attributes are identified, the actual manufacturing step, design characteristic, or material characteristic can be examined to determine what corrections or adjustments are to be made 30. Subsequently manufactured tires, that is, those manufactured by the corrected or adjusted procedures, would be expected to exhibit a reduced magnitude of the target attribute.

Subsequently manufactured tires could become new subject tires and the method of invention applied to these new subject tires to establish new baselines for the target attribute measurements and linkage to the indicator attributes. This is advantageous where the adjustment of a manufacturing procedure to minimize an attribute variance also reduces the importance or contribution of that attribute to the target attribute. Thus, the invention allows for both an optimization of manufacturing procedures and the procedures for testing and analyzing the tires.

To better illustrate the invention, the following comparison with conventional or known methods is provided. A set of tires was analyzed according to the method of the invention and was also analyzed using the known techniques of (1) using variations in radial force to predict tangential force variation at high speed (RFVs), where the low speed measurements are scalar parameters; (2) using variations in radial force to predict tangential force variation at high speed (RFVv), where the low speed measurements are vector quantities; (3) using variations in instantaneous rolling radius to predict high speed tangential force variation (IRR); and (4) using changes in rolling radius and variations in radial force variation to predict high speed tangential force variation. In addition, a prediction using all the variables (ALL) was performed as a check.

A group of 118 tires of size P215/75R15 was evaluated for radial force variation, tangential force variation, and variation in rolling speed (from which instantaneous rolling radius is calculated), during rotation under load. Each tire was rotated at high speeds (80 to 144 kph) and low speed (7 to 8 kph) and data was collected for harmonics 1 to 4 based on the average value over 15 tire revolutions. In addition, a low speed transient response was measured at 16 kph to obtain a difference in low speed attributes at two different low speeds. Mass balance was derived from the radial force and/or tangential force variation of the free spinning tire or measured separately.

The measured attributes were decomposed by Fourier transform into the harmonic component. The low speed and mass balance data were used as the indicator attributes (the inputs), and those for the high speed data were used as the target attributes (the outputs). In addition, radial force variation and tangential force variation were chosen as the target attributes.

The indicator attributes were subjected to condensation to eliminate interactions among the data and linear relationships were established among the inputs and outputs. A ranking to indicate the importance of the indicator attributes with respect to the target attributes was also generated, as explained above. In this example, among the harmonic one components, the most important input attributes are selections of two or three components of radial force variation, mass imbalance, tangential force variation, radial run out, and rolling radius variation.

The condensed indicator attributes were combined in various combinations to form predictors. The best predictors were shown to be the transient response attributes (the attributes measured at two low speeds) for radial force variation and tangential force variation, the transient response for rotation speed variation and radial force variation, and the combination of Radial Force Variation and Mass Imbalance (RFV+MB).

Transient response attributes in the example were derived from attributes measured at two rotational speeds, in this case, by a difference. "Transient" referring to a change in the attribute over the two speeds. Other transient responses may be of interest, for example, the attribute measurement over different loads, inflation pressure, etc. A transient response can also be measured as an indirect means of measuring mass distribution (higher than harmonic 1).

Table 1 shows the results of the comparison for Radial Force Variation (Fz) and Tangential Force Variation (Fx) at high speed for harmonics 1 to 4 for the various techniques. The All Attributes predictor (ALL) has the highest $R^2$ value throughout; however, it should be kept in mind that testing and analyzing all parameters of a tire is the most expensive and time consuming, and therefore, the least desirable technique. By comparison, it may be seen that, of the other predictors, the transient response predictors, dMvV and dMxV, consistently had the highest $R^2$ values.

The Radial Force Variation/Mass Imbalance predictor (RFV+MB) was also very strong for harmonic one, but was less strong for harmonics 2–4, which is expected because the measurement of mass imbalance is a first order measurement, that is, a mass value at a particular location relative to the axis of rotation. The strength of the Radial Force Variation/Mass Imbalance predictor suggests that mass imbalance is a significant contributor to high speed uniformity (force variation) at the first harmonic, and accordingly, is valuable for use in analyzing and controlling comfort.

The comparison also suggests that variations in Rolling Radius (IRR), which has traditionally been considered highly useful, may not be as useful as transient Rotation Speed variation, or the combination of Radial Force Variation and Mass Imbalance, particularly for the harmonic one components.

The invention has been described in terms of preferred principles, embodiments, and steps, but those skilled in the art will understand that substitutions may be made and equivalent steps performed without departing from the scope of the invention as defined in the claims.

What is claimed is:

1. A method of controlling uniformity during tire manufacture, comprising the steps of:
    selecting at least one target attribute and assigning a target value thereto;
    measuring the at least one target attribute in a subject tire at a first rotational speed approximating highway speed;
    measuring a plurality of indicator attributes in the subject tire;
    determining a plurality of predictors for each at least one target attribute, each predictor including at least one of the plurality of indicator attributes;
    selecting at least one predictor from the plurality of predictors;
    measuring indicator attributes of the selected predictor in an additional subject tire;
    predicting at least one value for the target attribute based on the at least one selected predictor for the additional subject tire; and
    comparing the at least one predicted value of the target attribute to the target value.

2. The method as claimed in claim 1, further comprising the steps of:

TABLE

| OUTPUT | | | IRR | RFVs | RFVv | dMvV | dMxV | RFV + MB | IRR + RFV | ALL |
|---|---|---|---|---|---|---|---|---|---|---|
| Harmonic | kph | TARGET | $R^2$ | $R^2$ | $R^2$ | $R^2$ | $R^2$ | $R^2$ | $R^2$ | $R^2$ |
| 1 | 80 | Fx | 0.30673 | 0.84331 | 0.93382 | 0.98631 | 0.98883 | 0.98513 | 0.94389 | 0.99429 |
| 1 | 100 | Fx | 0.40884 | 0.74124 | 0.89424 | 0.97442 | 0.97913 | 0.9759 | 0.91101 | 0.98969 |
| 1 | 120 | Fx | 0.42758 | 0.64019 | 0.85669 | 0.96174 | 0.97002 | 0.96416 | 0.87979 | 0.98419 |
| 1 | 140 | Fx | 0.39073 | 0.58437 | 0.83458 | 0.95066 | 0.95982 | 0.95361 | 0.86112 | 0.97709 |
| 1 | 148 | Fx | 0.3311 | 0.57844 | 0.83577 | 0.94686 | 0.95508 | 0.95132 | 0.8616 | 0.97363 |
| 1 | 80 | Fz | 0.40884 | 0.15358 | 0.4554 | 0.77306 | 0.88774 | 0.72718 | 0.55951 | 0.96039 |
| 1 | 100 | Fz | 0.42758 | 0.46579 | 0.7062 | 0.85583 | 0.91369 | 0.80929 | 0.75733 | 0.96674 |
| 1 | 120 | Fz | 0.39073 | 0.64591 | 0.81336 | 0.87696 | 0.90943 | 0.84101 | 0.83505 | 0.9538 |
| 1 | 140 | Fz | 0.3311 | 0.58913 | 0.81296 | 0.84981 | 0.87075 | 0.82599 | 0.82072 | 0.9098 |
| 1 | 148 | Fz | 0.30673 | 0.5493 | 0.80539 | 0.83948 | 0.85482 | 0.81864 | 0.80982 | 0.89143 |
| 2 | 80 | Fx | 0.30673 | 0.77344 | 0.91439 | 0.97813 | 0.97816 | 0.91439 | 0.92843 | 0.98328 |
| 2 | 100 | Fx | 0.54271 | 0.67367 | 0.88106 | 0.95721 | 0.95476 | 0.88106 | 0.89363 | 0.96498 |
| 2 | 120 | Fx | 0.42018 | 0.54313 | 0.82243 | 0.92642 | 0.92532 | 0.82243 | 0.83846 | 0.94371 |
| 2 | 140 | Fx | 0.26602 | 0.41553 | 0.7747 | 0.90656 | 0.90062 | 0.7747 | 0.79576 | 0.92494 |
| 2 | 148 | Fx | 0.16113 | 0.35342 | 0.73785 | 0.88337 | 0.87836 | 0.73785 | 0.76142 | 0.90437 |
| 2 | 80 | Fz | 0.54271 | 0.28284 | 0.45167 | 0.71377 | 0.93885 | 0.45167 | 0.68563 | 0.94914 |
| 2 | 100 | Fz | 0.42018 | 0.38737 | 0.61418 | 0.78697 | 0.914 | 0.61418 | 0.71925 | 0.92645 |
| 2 | 120 | Fz | 0.26602 | 0.33441 | 0.65469 | 0.80341 | 0.87853 | 0.65469 | 0.67987 | 0.90377 |
| 2 | 140 | Fz | 0.16113 | 0.20647 | 0.61488 | 0.77949 | 0.81619 | 0.61488 | 0.61734 | 0.85688 |
| 2 | 148 | Fz | 0.13923 | 0.17993 | 0.59966 | 0.77436 | 0.8028 | 0.59966 | 0.60173 | 0.84647 |
| 3 | 80 | Fx | 0.13923 | 0.88359 | 0.98144 | 0.98729 | 0.98753 | 0.98144 | 0.98214 | 0.98931 |
| 3 | 100 | Fx | 0.5811 | 0.8775 | 0.97755 | 0.98866 | 0.98812 | 0.97755 | 0.97871 | 0.99207 |
| 3 | 120 | Fx | 0.34286 | 0.76941 | 0.95487 | 0.97238 | 0.97004 | 0.95487 | 0.95824 | 0.98597 |
| 3 | 140 | Fx | 0.22307 | 0.42631 | 0.84117 | 0.8868 | 0.87851 | 0.84117 | 0.85297 | 0.95512 |
| 3 | 148 | Fx | 0.16906 | 0.23091 | 0.68445 | 0.74363 | 0.7456 | 0.68445 | 0.69963 | 0.90019 |
| 3 | 80 | Fz | 0.5811 | 0.00083 | 0.37747 | 0.68543 | 0.95693 | 0.37747 | 0.83455 | 0.96785 |
| 3 | 100 | Fz | 0.34286 | 0.05068 | 0.60184 | 0.79357 | 0.9418 | 0.60184 | 0.8506 | 0.9546 |
| 3 | 120 | Fz | 0.22307 | 0.14167 | 0.72969 | 0.85079 | 0.92296 | 0.72969 | 0.84953 | 0.94111 |
| 3 | 140 | Fz | 0.16906 | 0.11995 | 0.74278 | 0.85828 | 0.89687 | 0.74278 | 0.81481 | 0.92244 |
| 3 | 148 | Fz | 0.05586 | 0.11897 | 0.64835 | 0.76681 | 0.8343 | 0.64835 | 0.72473 | 0.87985 |
| 4 | 80 | Fx | 0.05586 | 0.89201 | 0.97254 | 0.98378 | 0.98364 | 0.97254 | 0.97668 | 0.98957 |
| 4 | 100 | Fx | 0.80593 | 0.70853 | 0.92136 | 0.95298 | 0.95443 | 0.92136 | 0.94418 | 0.98125 |
| 4 | 120 | Fx | 0.71056 | 0.05395 | 0.49648 | 0.6827 | 0.78161 | 0.49648 | 0.71143 | 0.91782 |
| 4 | 140 | Fx | 0.16962 | 0.44023 | 0.75019 | 0.83935 | 0.80802 | 0.75019 | 0.76402 | 0.91084 |
| 4 | 148 | Fx | 0.26552 | 0.38027 | 0.79522 | 0.87217 | 0.85561 | 0.79522 | 0.83764 | 0.94292 |
| 4 | 80 | Fz | 0.80593 | 0.02623 | 0.25223 | 0.66928 | 0.95666 | 0.25223 | 0.90523 | 0.97528 |
| 4 | 100 | Fz | 0.71056 | 0.01914 | 0.22858 | 0.62009 | 0.89235 | 0.22858 | 0.86749 | 0.93842 |
| 4 | 120 | Fz | 0.16962 | 0.41031 | 0.64512 | 0.72104 | 0.75234 | 0.64512 | 0.70231 | 0.88809 |
| 4 | 140 | Fz | 0.26552 | 0.54394 | 0.7216 | 0.822 | 0.81054 | 0.7216 | 0.74148 | 0.88077 |
| 4 | 148 | Fz | 0.599 | 0.2562 | 0.69941 | 0.82805 | 0.84223 | 0.69941 | 0.79133 | 0.90075 | comparing the measured indicator attributes making up the at least one selected predictor to limit values for the indicator attributes to determine a deviation therebetween;

identifying a manufacturing operation related to the deviation; and responsive to the comparison, controlling the identified manufacturing operation to correct the deviation for at least an additional subject tire.

3. The method as claimed in claim 1, wherein the at least one target attribute is a tire force response produced during rotation of the tire.

4. The method as claimed in claim 1, wherein radial force variation and tangential force variation are the target attributes.

5. The method as claimed in claim 1, wherein the plurality of indicator attributes includes a force response produced during rotation of the tire at a second rotational speed lower than the first rotational speed and a geometric variance.

6. The method as claimed in claim 1, wherein the plurality of indicator attributes includes one of mass imbalance and mass distribution.

7. The method as claimed in claim 1, wherein the plurality of indicator attributes includes attributes measured under transient conditions.

8. The method as claimed in claim 1, further comprising the step of sorting tires responsive to the comparison of the predicted value to the target value.

9. The method as claimed in claim 1, wherein the step of determining a plurality of predictors includes removing from each predictor indicator attributes which overlap in measured data.

10. The method as claimed in claim 1, wherein the at least one predictor includes mass imbalance and radial force variation at harmonic one.

11. The method as claimed in claim 1, wherein the at least one predictor includes at least one attribute measured under transient conditions.

12. A method of controlling uniformity during tire manufacture, comprising the steps of:

selecting at least one target attribute and assigning a target value to each;

measuring the at least one target attribute in a subject tire at a first rotational speed approximating highway speed;

measuring mass imbalance of the subject tire;

measuring in the subject tire indicator attributes at a second rotational speed lower than the first rotational speed;

determining a plurality of predictors for the target attribute, each predictor having components including at least mass imbalance and one additional indicator attribute;

relating separately each predictor of the plurality of predictors to the target attribute;

selecting a predictor from the plurality of predictors based on accuracy of predicting the target attribute;

measuring in the additional subject tire the components of the selected predictor at the second rotational speed;

predicting a value for each of the at least one target uniformity attributes based on the selected predictor for the additional subject tire; and comparing the predicted value to the at least one target value.

13. The method as claimed in claim 12, further comprising the steps of:

comparing the measurements for the indicator attributes making up the selected predictor to limit values for the indicator attributes; and, controlling tire manufacture to correct any deviation between the measured attribute and the limit value for at least an additional subject tire, responsive to the comparison.

14. A method of analyzing uniformity during tire manufacture, comprising the steps of:

selecting at least one target attribute and assigning a target value to each;

measuring the at least one target attribute in a subject tire at a first rotational speed approximating highway speed;

measuring in the subject tire indicator attributes a first time at a second rotational speed lower than the first rotational speed;

measuring in the subject tire the indicator attributes a second time under transient conditions, wherein one of load on the tire, tire pressure, and rotational speed differs from the first time;

determining a plurality of predictors for the at least one target attribute, each predictor having components chosen from the indicator attributes;

selecting at least one predictor from the plurality of predictors;

measuring in at least one additional subject tire the components of the selected predictor;

predicting for the at least one additional subject tire a value for the at least one target uniformity attribute based on the selected at least one predictor; and comparing the predicted value to the target value.

15. The method as claimed in claim 1, wherein the step of determining a plurality of predictors comprises the step of condensing the plurality of indicator attributes to principal components to relate each indicator attribute to variance in the at least one target attribute.

16. The method as claimed in claim 15, wherein the step of determining a plurality of predictors comprises linking each predictor of the plurality of predictors to the target attribute, and determining how accurately each predictor predicts the target attribute.

17. A method of controlling uniformity during tire manufacture, comprising the steps of:

selecting at least one target attribute and assigning a target value thereto;

measuring the at least one target attribute in a subject tire at a first rotational speed approximating highway speed;

measuring a plurality of indicator attributes in the subject tire;

condensing the plurality of indicator attributes;

determining a plurality of predictors for each at least one target attribute, each predictor including at least one of the condensed plurality of indicator attributes;

linking the plurality of predictors to the target attributes and assigning a value to each predictor representative of how close each predictor predicts the at least one target attribute;

selecting a predictor from the plurality of predictors that best represents the target attribute;

measuring indicator attributes of the selected predictor in an additional subject tire;

predicting at least one value for the target attribute based on the at least one selected predictor for the additional subject tire; and comparing the at least one predicted value of the target attribute to the target value.

18. A method of controlling uniformity during tire manufacture, comprising the steps of:

selecting at least one target attribute and assigning a target value thereto;

measuring the at least one target attribute in a subject tire at a first rotational speed approximating highway speed;

measuring a plurality of indicator attributes in the subject tire;

determining a plurality of predictors for each at least one target attribute, each predictor including at least one of the plurality of indicator attributes;

selecting at least one predictor from the plurality of predictors;

measuring indicator attributes of the selected predictor in an additional subject tire;

predicting at least one value for the target attribute based on the at least one selected predictor for the additional subject tire;

comparing the at least one predicted value of the target attribute to the target value;

comparing the measured indicator attributes making up the at least one selected predictor to limit values for the indicator attributes to determine a deviation therebetween;

identifying a manufacturing operation related to the deviation; and responsive to the comparison, controlling the identified manufacturing operation to correct the deviation for at least an additional subject tire.

* * * * *